W. C. KNIGHT.
LIQUID FLOW INDICATOR.
APPLICATION FILED NOV. 3, 1914.

1,249,120.

Patented Dec. 4, 1917.
2 SHEETS—SHEET 1.

Witnesses.
J. Morrill Fuller
William E. Gagen

Inventor.
William C. Knight
by Heard Smith & Tennant,
Att'ys

W. C. KNIGHT.
LIQUID FLOW INDICATOR.
APPLICATION FILED NOV. 3, 1914.

1,249,120.

Patented Dec. 4, 1917.
2 SHEETS—SHEET 2.

Witnesses.
J. Morrill Fuller
William C. Gagen

Inventor.
William C. Knight
by Heard Smith & Tennant
Att'ys

UNITED STATES PATENT OFFICE.

WILLIAM C. KNIGHT, OF DETROIT, MICHIGAN.

LIQUID-FLOW INDICATOR.

1,249,120.      Specification of Letters Patent.      Patented Dec. 4, 1917.

Application filed November 3, 1914. Serial No. 870,140.

*To all whom it may concern:*

Be it known that I, WILLIAM C. KNIGHT, a citizen of the United States, residing at Detroit, county of Wayne, State of Michigan, have invented an Improvement in Liquid-Flow Indicators, of which the following description, in connection with the accompanying drawing, is a specification, like characters on the drawing representing like parts.

This invention has for its object to provide a novel indicator to be applied to a circulating system for liquids to indicate whether or not the liquid is flowing properly in the system. The invention is especially designed for use in connection with the oiling systems of automobiles and similar mechanism where oil is supplied to the bearings from a pump which forces it through pipes or conduits leading to the bearings, although the invention is applicable to other forms of liquid circulating systems.

In an oiling system for automobiles it is important for the operator to know whether or not the oil is properly flowing, for if the oil becomes clogged for any reason, then the bearings fail to be properly lubricated and more or less serious injury may result. The device embodying my invention comprises a casing having inlet and outlet ports which are connected to the pipe or conduit of the circulating system, a chamber connecting said ports so that when the liquid is circulating it will pass through the chamber, a movable barrier in the chamber which is held in one position by the pressure of the liquid thereagainst when the liquid is properly flowing and is held in another position by automatically-operative means when the liquid ceases to flow, and means to indicate the position of the barrier.

I will preferably employ magnetic indicating means for this purpose.

In order to give an understanding of my invention I have illustrated in the drawings some selected embodiments thereof which will now be described, after which the novel features will be pointed out in the appended claims.

In the drawings, Figure 1 is a vertical sectional view through a support showing my improved indicator mounted therein, the indicator being illustrated in side elevation;

Figure 1:
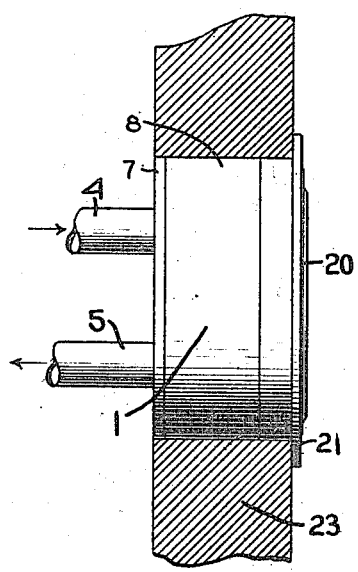

The device herein illustrated in Figs. 1 to 4 comprises a casing 1 having an inlet port 2, an outlet port 3 and a chamber 40 connecting said ports and communicating therewith. The inlet ports 2 and 3 are connected to pipes 4 and 5 of the circulating system with which the indicator is used. If the device is used for indicating the flow of oil in an oiling system for automobiles, then the pipes 4 and 5 will, of course, constitute the pipes through which the oil is delivered from the pump to the bearings. With this construction it will be seen that when the oil is circulating through the system it passes through the pipe 4 in the direction of the arrow, through the inlet port 2 into the chamber 40, out through the outlet port 3, and thence through the pipe 5 in the direction of the arrow.

Figure 3:
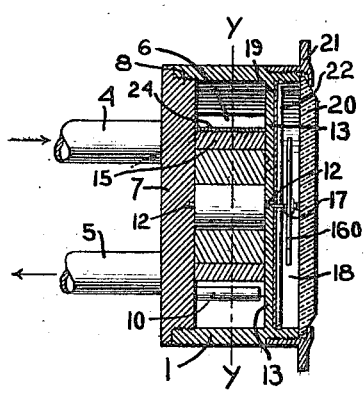
Fig. 3 is a section on the line *x—x*, Fig. 4.

The casing 1 may have any suitable construction. I have herein shown it as formed in a cylindrical shell, one end of which is closed by the removable head 7, the latter having screw-threaded engagement with the casing shell, as shown at 8. The inlet ports 2 and 3 are shown as formed in this end 7. At one end of the chamber 40 is a fixed or permanent wall 6 which is herein shown as situated adjacent the inlet port 2. Mounted in the chamber 40 is a movable member or barrier 9 which constitutes the opposite end of the chamber, said barrier 9 being movable toward and from the wall 6, thus constituting a chamber 40 having a varying capacity. When the oil or other liquid is flowing through the system, the movable barrier or member 9 will assume the position shown in full lines Fig. 4 beyond the outlet opening 3 so that there is a free communication between the inlet and outlet openings. A suitable stop 10 may be provided if desired for limiting the movement of the barrier 9. Means are provided whereby when there is no liquid flowing the member 9 will move toward the member 6 into the dotted line position Fig. 4 thereby cutting off the outlet port 3. Any suitable means whereby this end may be accomplished may be provided. As herein shown the member 9 is mounted on a rotatable support 11 which is mounted in the casing 1 for turning movement, said support being herein shown as having trunnions 12 extending therefrom which are received in the head 7 and opposite wall 13 of the chamber 40, as best seen in Fig. 3. Suitable automatically-operative means is employed in connection with the member 11 to hold the barrier or member 9 normally in the dotted line position when no liquid is flowing, the automatically-operative means herein illustrated being in the form of a counterweight 14 which is sufficient to overcome the weight of the barrier 9. When there is no pressure against the barrier, the parts will assume the dotted line position, thus cutting off communication between the inlet and outlet ports. Assuming that the parts are at rest and no oil is being fed and that the barrier 9 is in the dotted line position Fig. 4, then when the pump is started to start up the circulation of oil, the pressure of the oil or other fluid against the movable barrier 9 and the weight of the oil or fluid on the barrier will overcome the counterweight 14 and cause the parts to move into the full line position Fig. 4, thus opening the outlet port 3 and permitting the oil or other fluid to circulate in the pipes 4 and 5. If the circulation of the oil stops for any reason, the oil in the chamber 40 will flow out through the outlet port 3 and thus remove the weight of the oil on and pressure of the latter against the barrier 9, and when this occurs the counterweight 14 will automatically return the parts to the dotted line position Fig. 4.

My invention involves a suitable visible indicator which indicates the position of the barrier 9 and thereby indicates whether the liquid is flowing properly through the chamber 40 or whether the liquid has ceased flowing. In the illustrated embodiment of my invention I have shown a magnetic indicator comprising a magnet which is carried by the holder or carrier 11 and a magnetic indicating needle, the position of which is controlled by the magnet. The magnet may have any suitable shape. I have shown it herein as a horse-shoe magnet 15 having the two pole pieces 16, said magnet having a substantially circular form and being mounted on the carrier 11. The magnetic indicating needle is shown at 160 and it is mounted on a pivot 17 and is sustained in a chamber 18 formed in the casing 1 and separated from the chamber 40 by the imperforate wall 13. The chamber 18 may be formed by a recess provided in the end of the casing 1.

Figure 2:
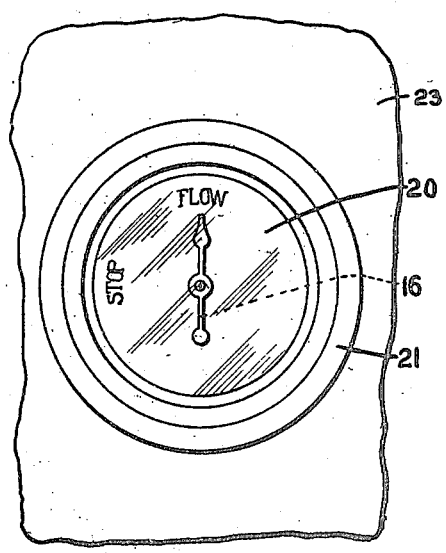
Fig. 2 is a front view of the indicator.

The action of the magnet 15 on the needle 160 causes the needle to follow the turning movement of the magnet. When the parts are in the position shown in Fig. 4 the magnetic needle will stand vertically, as shown in Fig. 2, while when the parts are in the position shown in dotted lines Fig. 4 the magnetic needle will assume substantially the position pointing to the word "Stop" in Fig. 2. The needle 160 will, therefore, indicate the position of the barrier 9 and the position of the latter indicates whether or not the liquid is flowing through the system.

I will preferably place a suitable dial 19 in the chamber 18 beneath the needle 16 on which dial may be printed such words as "Flow" and "Stop" or any other suitable words at the two places which the indicating needle 16 will assume. The chamber 18 is shown as closed by a glass disk 20 which may be held in place by a bezel 21 screwed onto the casing. The dial 19 is shown as held in place by the spring ring 22.

Where the device is used for indicating the oil flow in the oiling system of an automobile, I propose to place the indicator in some suitable position where the needle 160 can be observed by the person operating the machine, such, for instance, as on the instrument board or cowl board 23. In the drawings the instrument-board is shown as having an aperture therethrough in which the casing 1 is inserted, the face of the casing being visible through the front of the board.

The advantage of using a magnetic indicating needle is that the wall 13 of the casing can be made imperforate, thus absolutely preventing any oil from leaking into the chamber 18.

Figure 4:
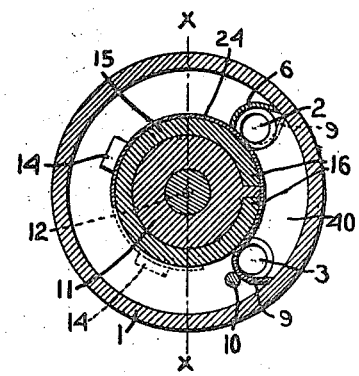
Fig. 4 is a section on the line *y—y*, Fig. 3.
Figure 5:
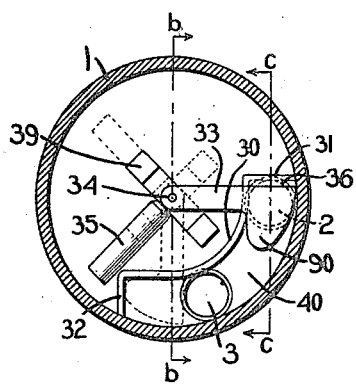
Fig. 5 is a sectional view through an indicator showing a different embodiment of the invention.
Figure 6:
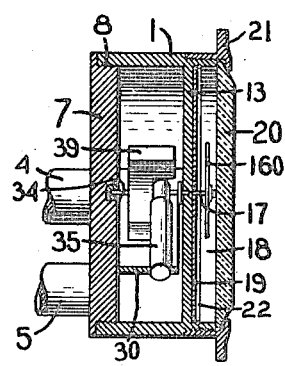
Fig. 6 is a section on the line *b—b*, Fig. 5.

In the embodiment of the invention illustrated in Figs. 3 and 4 the barrier 9 is cup-shaped so as to make a sort of bucket or cup to hold a sufficient quantity of the liquid to overcome the effect of the counterbalance 14. This barrier is formed by bending up the end of a piece 24 of sheet metal which is secured to the exterior of the magnet 15, the counterweight 14 being shown as carried by the strip. This sheet 24 thus forms the inner and one end wall of the chamber 40, and in practice it will be of a width to fit between the walls 7 and 13 of the chamber so as to make a sufficiently tight joint for the purpose described without, however, causing the parts to bind. It is, of course, desirable that the carrier 12 should rotate comparatively freely so that the presence of oil or other liquid in the chamber 40 or the absence of it therefrom will cause said carrier to assume either the full or the dotted line position.

Figure 7:
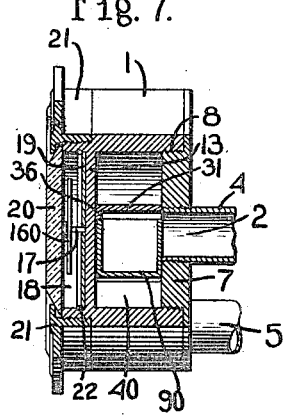
Fig. 7 is a section on the line *c—c*, Fig. 5.
Figure 8:
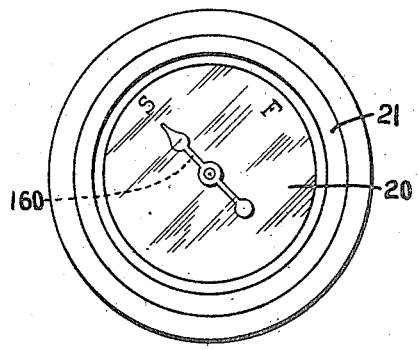
Fig. 8 is a front view of the indicator shown in Figs. 5, 6 and 7.

In Figs. 5, 6, 7 and 8 I have shown another embodiment of my invention which, however, operates on the same principle as the device shown in Figs. 1 to 4, the difference being largely in the shape of the magnet and counterweight and the particular shape of the movable barrier. In the device shown in Figs. 5 to 8 the casing 1 is provided on its interior with the rib or wall 30 which forms the inner and end walls of the chamber 40. This rib may be cast integral with the end 7 or may be a strip of metal bent to the right shape and secured to said end 7. In any event this wall 30 is formed at its ends 31 and 32 to make the ends of the chamber 40. The movable barrier is in the form of a cup 90 carried by an arm 33 which is fast on a pivotal shaft 34 journaled in the head 7 and the partition 13. This shaft 34 carries a counterweight 35 which operates within the casing outside of the chamber 40 and is of sufficient weight to overcome the weight of the arm 33 and barrier 90 so that when no oil is flowing the parts will assume the full line position Fig. 5 and the barrier 90 will stand opposite the inlet port 2 and will lie against the flange or stop 36 associated with the end wall 31 of the chamber 40. When the parts are in this position the inlet port 2 has communication with the cup-shaped barrier 90 over the top edge thereof, as shown in Fig. 7, so that when the oil flows through the pipe 4 it will first fill the cup shaped member 90. The weight of the oil in the cup and the pressure of the oil due to its circulation will swing the cup 90 downwardly in the chamber 40 past the outlet port 3 and into the dotted line position Fig. 5, the movement of the cup-shaped barrier 90 in this direction being limited by the end wall 32 of the chamber 40. When the cup-shaped barrier is in the dotted line position the outlet port is opened and the oil can freely flow from the pipe 4 through the chamber 40 to the pipe 5 and thence on to the piping of the oiling system. So long as the oil is flowing the cup-shaped barrier will be held in the dotted line position Fig. 5, but as soon as the oil stops flowing the counterweight 35 will return the parts to the full line position Fig. 5. The device shown in Figs. 5 to 8 has the visible indicator 160 as in the embodiment of the invention shown in Figs. 1 to 4. The position of the indicator is controlled by a magnet 39 mounted on the shaft 34. In both embodiments of my invention the chamber in which the indicator pointer is received is entirely separate from the chamber in which the oil is flowing, and as there is no communication between these chambers it is impossible for any oil to get into the chamber 18 to obscure the view of the pointer 160. This result is secured by the use of the magnet for controlling the position of the pointer 160.

While I have illustrated herein some selected embodiments of my invention I do not wish to be limited to the constructional features shown.

I claim:

1. In a liquid flow indicator, the combination with a casing having an inlet port and an outlet port connected by a passage with the inlet port situated above the outlet port, of a movable cup-shaped barrier in said passage, having its open end directed upwardly toward the inlet end of the passage and adapted to be moved from the inlet to a position beyond the outlet port both by the weight of the liquid in said barrier and the pressure thereagainst of the liquid entering the inlet port, said barrier closing communication between said ports until in its movement it begins to uncover the outlet port, automatically-operative means tending to move the barrier toward the inlet port when the flow of liquid ceases, and visible means to indicate the position of the barrier.

2. In a liquid flow indicator, the combination with a casing having an inlet and an outlet port connected by a curved passage, of a movable cup-shaped barrier in said passage having its open end directed upwardly toward the inlet end of the passage and adapted to be moved from the inlet port to a position beyond the outlet port by the weight of the liquid in said barrier and the pressure thereagainst of the liquid entering the inlet port, said inlet and outlet ports having such relative position that when the barrier has moved beyond the outlet port to open the latter, said barrier will be turned into a position to discharge the liquid therein, automatically-operative means tending to move the barrier toward the inlet port when the flow of liquid ceases, and means to indicate the position of the barrier.

In testimony whereof, I have signed my name to this specification, in the presence of two subscribing witnesses.

WILLIAM C. KNIGHT.

Witnesses:
 Louis C. Smith,
 Thomas J. Drummond.

Copies of this patent may be obtained for five cents each, by addressing the "Commissioner of Patents, Washington, D. C."